No. 893,968. PATENTED JULY 21, 1908.
W. E. ALLINGTON.
PIPE REDUCER FOR DUST COLLECTING SYSTEMS.
APPLICATION FILED APR. 6, 1907.
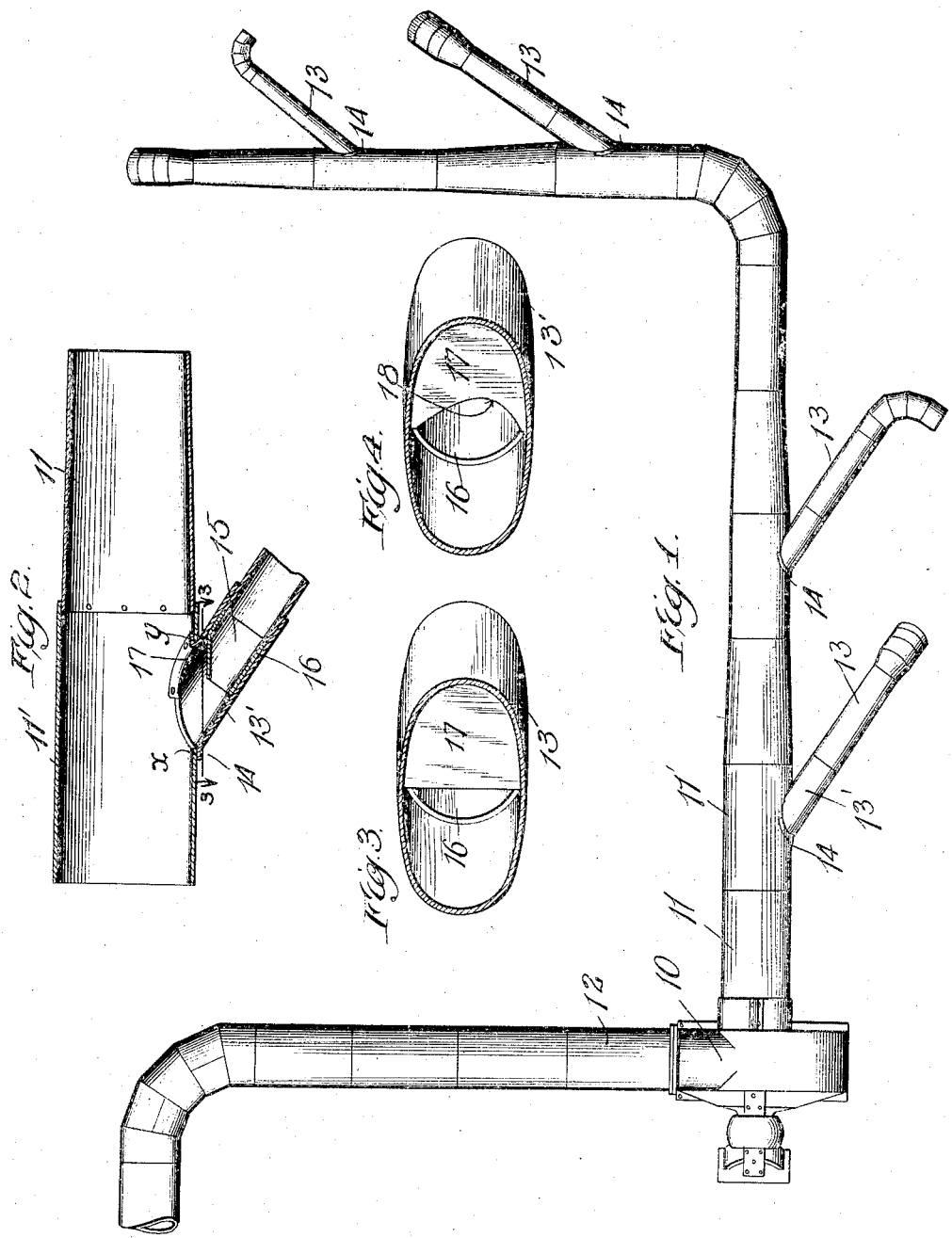
Witnesses
Ray White
Harry R. L. White
Inventor
William E. Allington
By Forée Bain and May
Attys

UNITED STATES PATENT OFFICE.

WILLIAM E. ALLINGTON, OF SAGINAW, MICHIGAN.

PIPE-REDUCER FOR DUST-COLLECTING SYSTEMS.

No. 893,968.  Specification of Letters Patent.  Patented July 21, 1908.

Application filed April 6, 1907. Serial No. 366,710.

*To all whom it may concern:*

Be it known that I, WILLIAM E. ALLINGTON, a citizen of the United States, residing at Saginaw, in the county of Saginaw and State of Michigan, have invented certain new and useful Improvements in Pipe-Reducers for Dust-Collecting Systems, of which the following is a specification.

My invention relates to pipe reducer for dust collecting systems, and has for its object to provide an adjusting reducer for insertion in the branch pipe connections, of T-joints, of dust collecting systems, to afford convenient means for so properly proportioning the effective areas of communication between the mains and branch pipes as to secure in the various branches desired suction-ratios.

In my prior patent No. 840,894 dated January 8, 1907, I have disclosed a slide valve construction addressed to this end, but such valve construction for installation in old plants requires an accommodating structural change in the piping proper, necessitating disconnection of the main suction pipe joint-section, and, consequently, stoppage of the operation of the entire main during the installation; and further special sizes of piping would often require expensive special valves. In some instances such shut-down of the plant, and the expense of special valves are most undesirable, and to meet such conditions and provide a reducer of low cost, adapted for application to old piping systems without disturbance of the main or expensive change in old construction work, my present invention is designed.

To these ends my invention consists in a reducer for insertion in the branch member of a branch pipe T-joint, having a free opening toward the main of less area than the normal area of the branch piping, such reducer preferably comprising a positioning wall, to interfit within the branch arm or T-stem of the joint member, and an easily-reducible restriction wall arranged at an angle to the positioning wall to restrict the area of the device at its forward end or nose.

A suitable construction is indicated in the drawing wherein;

Figure 1 is a plan view of a portion of a dust collecting system; Fig. 2 is an enlarged detail in plan section of the joint embodying the reducer; Fig. 3 is a section on line 3—3 of the reducer in original condition, and; Fig. 4 is a like view showing the reducer cut away somewhat.

Throughout the drawing like numerals of reference refer always to like parts.

10 indicates a fan, drawing from the main suction pipe 11, and blowing into outlet pipe 12.

13—13 indicate branch pipes, each connected with the main by an acute-angle joint or T, 14, comprising a section 11' constituting part of the main suction pipe 11 and a section 13' constituting part of the branch pipe 13. In accordance with usual practice the main suction pipe is at all points properly proportioned in area to the combined areas of the pipe and branches beyond it.

15 indicates in general the reducer, comprising a positioning wall 16 to interfit snugly within joint section 14' and butting against the inserted end of the adjacent section of branch pipe 13, and a restriction wall 17, arranged at an angle to the axis of the peripheral wall 16 corresponding to the angle of the joint 14, and preferably about half closing the end of wall structure 16. In construction the wall 16 is cut away at the proper angle, and the wall 17 is riveted, soldered or otherwise secured upon the inclined edge thereof.

In arrangement the restricter or reducer is inserted with its restricting wall toward the heel, Y, and the open nose toward the toe, X, of the joint. (Fig. 2.) The wall 17 is made of stock easily reducible by cutting or "snipping", and to accurately proportion the area of communication of any branch pipe with the main suction pipe, to secure a desired degree of suction in the branch pipe, the wall 17 is cut away, the cut, for best results, being deepest near the bottom of the wall below the plane of the joint, (as indicated at 18 in Fig. 4.) where the material naturally travels.

While the construction described is obviously not adjustable with the ease of a valve, and requires change of actual dimensions by trimming away of material for the increase of the free area of communication to the desired extent, yet it is of construction which makes easy changes of its restriction-wall dimensions, is cheap, and is susceptible of easy removal and replacement without crippling the whole system served by the main suction pipe, and without removal of the T-joint from the main. Thus, for old installations these reducers perform the essential function of proportioning the effective branch pipe-areas, and thereby proportioning the suction-effects in such pipes, in a manner simple and satisfactory.

While I have herein described in detail a particular structure embodying my invention, it will be apparent that such invention may be embodied in devices differing in details of construction from that described.

Having thus described my invention, what I claim and desire to secure by Letters Patent, of the United States, is:

1. In a dust collecting system, the combination with a branch-pipe T-joint, of a reducer inserted in the branch element of such joint, having a free opening toward the main of less area than the normal area of the branch.

2. A piping reducer for dust collecting systems, comprising a positioning part for engagement with the interior of the pipe, and a reduction wall arranged to close one side only of the pipe.

3. A piping restricter comprising a positioning annulus for fitting within a pipe, and a wall of material adapted to be cut or "snipped" closing one side only of one end of said annulus.

4. A piping restricter comprising a positioning annulus for fitting within a pipe, and a restriction wall closing one side of the annulus and arranged at an acute angle to the axis of such annulus.

5. In combination with a branch pipe joint, of a dust-collecting system, providing a main pipe part and a branch pipe part, arranged at an acute angle, of a branch pipe restricter arranged in the branch pipe part of said joint, and comprising a positioning member frictionally engaging the interior of such branch pipe part, and a restriction member secured thereto and positioned in parallelism to the axis of the main pipe part to close a portion of the branch pipe part adjacent the heel of the joint.

In testimony whereof I hereunto set my hand in the presence of two witnesses.

WILLIAM E. ALLINGTON.

In the presence of—
 GEO. T. MAY, Jr.,
 MARY F. ALLEN.